(No Model.)  3 Sheets—Sheet 1.
S. J. PLANT.
BRICK KILN.
No. 474,922. Patented May 17, 1892.
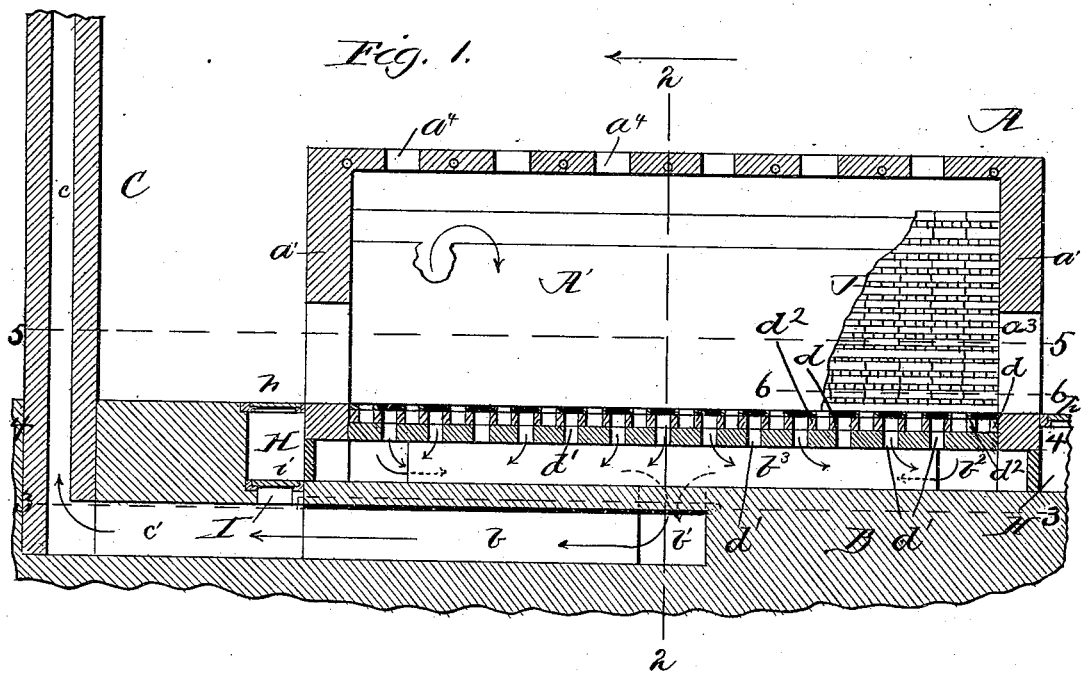
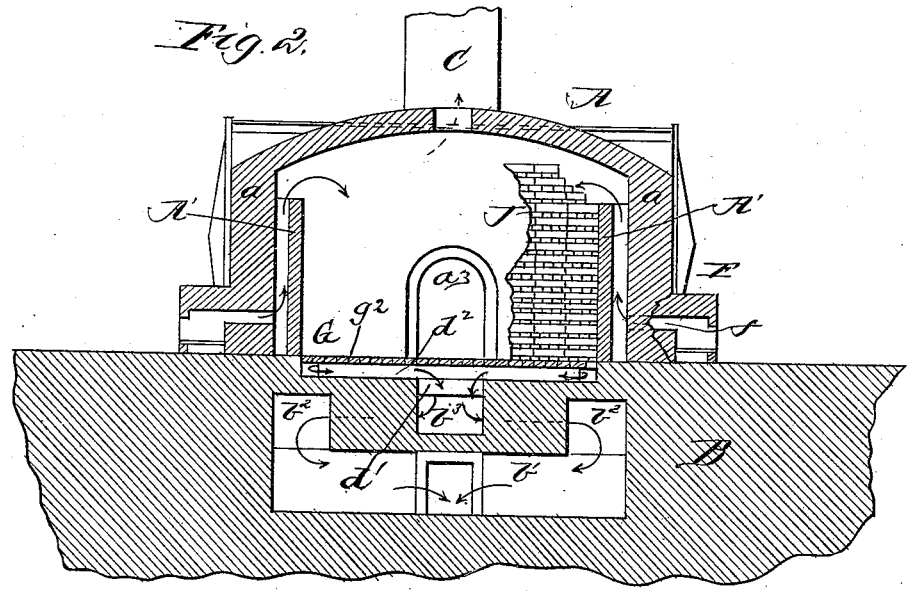
Witnesses.
W. C. Colies
Fredk. A. Pattee
Inventor
Stephen J. Plant.
By Coburn & Thacher
Attys.

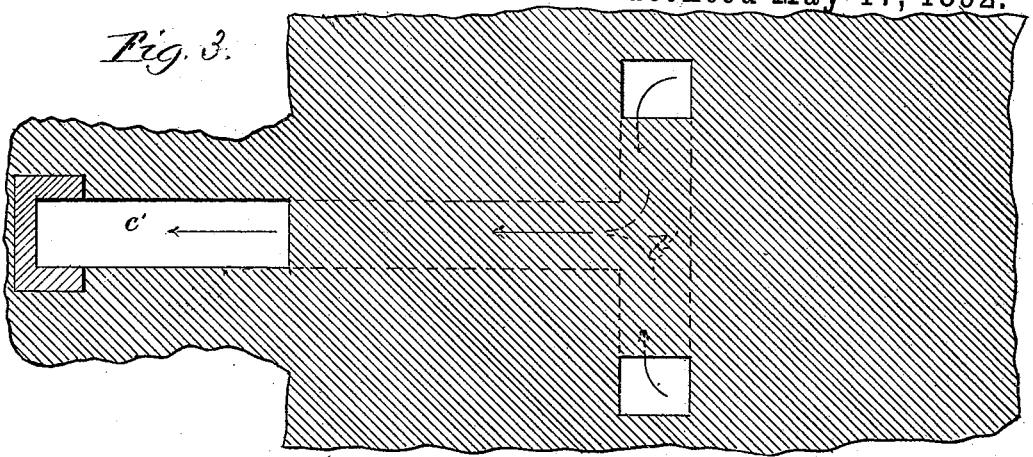
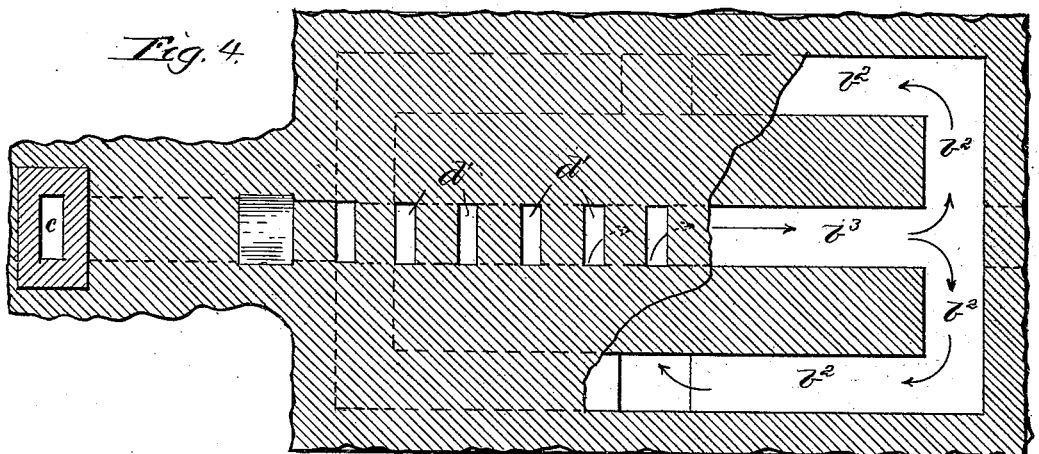
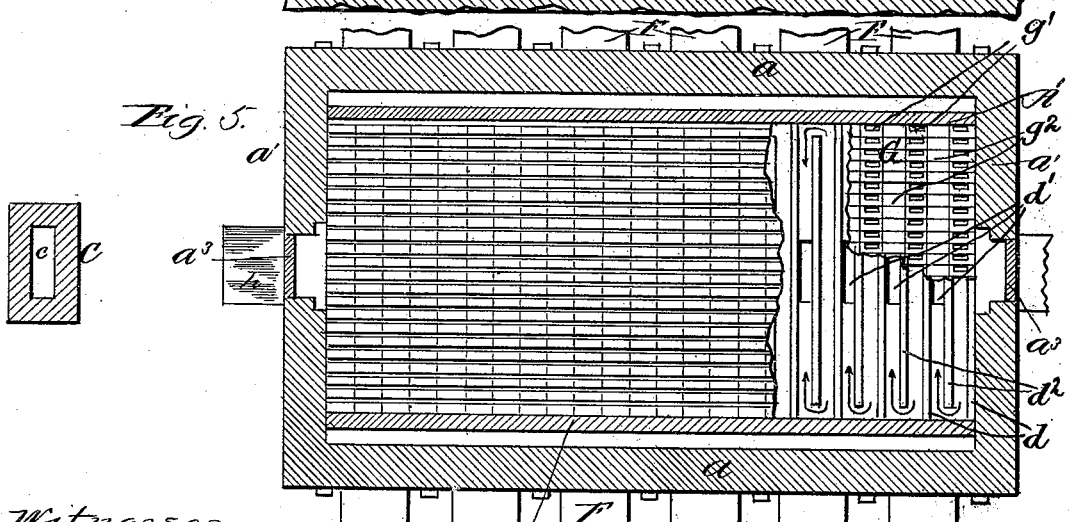

(No Model.) 3 Sheets—Sheet 3.
S. J. PLANT.
BRICK KILN.
No. 474,922. Patented May 17, 1892.
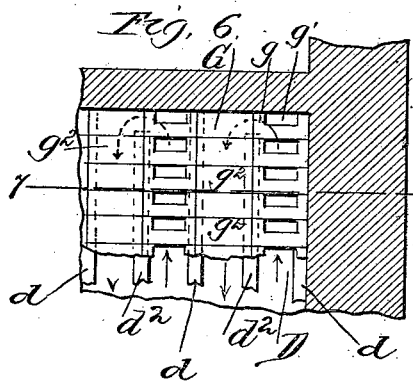
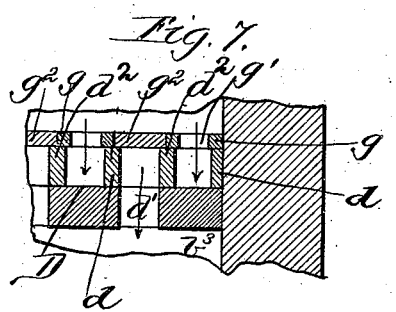
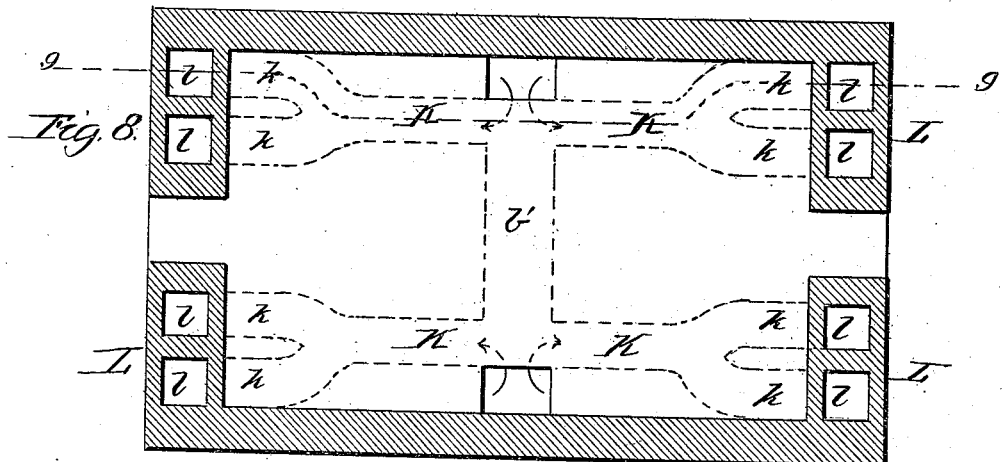
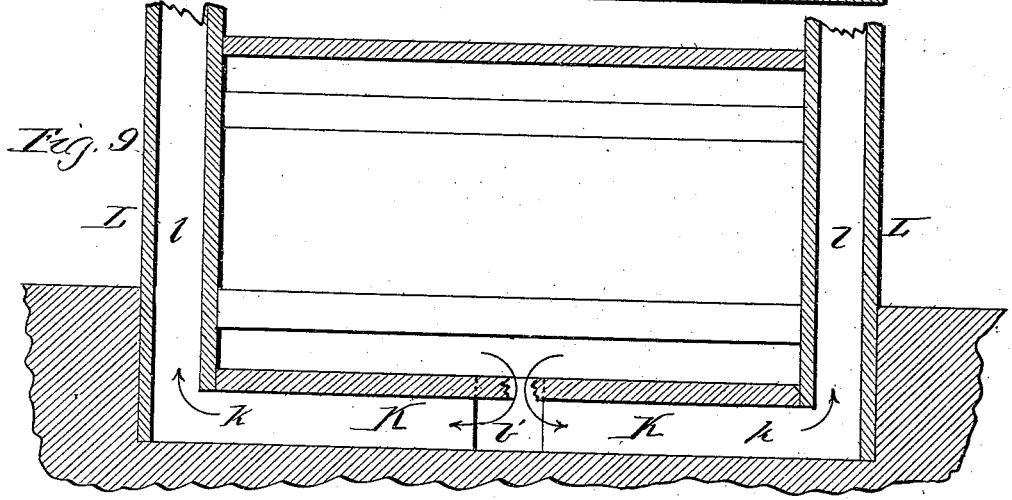
Witnesses.
W. C. Coolies
Fredk. H. Mills
Inventor
Stephen J. Plant.
By Coburn & Thacher
Attys.

UNITED STATES PATENT OFFICE.

STEPHEN J. PLANT, OF MOMENCE, ASSIGNOR OF ONE-HALF TO THE TIFFANY PRESSED BRICK COMPANY, OF CHICAGO, ILLINOIS.

BRICK-KILN.

SPECIFICATION forming part of Letters Patent No. 474,922, dated May 17, 1892.

Application filed January 25, 1892. Serial No. 419,152. (No model.)

*To all whom it may concern:*

Be it known that I, STEPHEN J. PLANT, a subject of the Queen of Great Britain, residing at Momence, in the county of Kankakee and State of Illinois, have invented certain new and useful Improvements in Brick-Kilns, which are fully set forth in the following specification, reference being had to the accompanying drawings, in which—

Figure 1 represents a longitudinal vertical section of a kiln embodying my improvements; Fig. 2, a cross-section of the same, taken on the line 2 2 of Fig. 1; Fig. 3, a plan section taken on the line 3 3 of Fig. 1; Fig. 4, a similar section taken on the line 4 4 of Fig. 1; Fig. 5, a similar section taken on the line 5 5 of Fig. 1, the regular floor being partly broken away and the kiln represented as partly filled with brick; Fig. 6, a detail plan section on the line 6 6 of Fig. 1; Fig. 7, a detail vertical section of the same, taken on the line 7 7 of Fig. 6; Fig. 8, a plan section showing a modification in construction, the section being taken on the same plane as Fig. 3; and Fig. 9, a vertical section of the same, taken on the line 9 9 of Fig. 8.

The figures of the drawings are all upon the same scale, with the exception of Figs. 6 and 7, which are upon one scale, but considerably enlarged from that of the others.

My invention relates to kilns designed for burning brick, drain-tiles, terra-cotta, and other articles of pottery.

The invention consists in certain special features of construction whereby a satisfactory circulation is obtained and the full effect of the heat produced by the combustion of the fuel is utilized.

I will now describe in detail the construction and operation of a brick-kiln in which I have embodied my invention in one practical working form, and will then point out more definitely in claims the particular improvements which I believe to be new and wish to secure by Letters Patent.

My improved kiln, as a whole, consists of a superstructure A or part above the level of the ground and a substructure B underneath the former and below the level of the ground, the latter portion of the structure being, in fact, made in the earth itself. I will first describe the substructure. Some distance below the surface of the ground—say, four or five feet—there is made a tunnel or passage $b$, which runs lengthwise of the kiln and is arranged about centrally of the width of the latter. This passage commences at the end of the kiln next to the chimney-stack C and extends about half the length of the upper portion of the kiln, where it is met by a cross passage or tunnel $b'$, extending at right angles to the passage $b$ and in length about equal to the interior width of the kiln. The tunnel $b$ is extended outward and connects with the flue $c$ of the stack by a like passage $c'$, which is practically an extension simply of $b$. A passage or tunnel $b^2$ is made in the ground running entirely around a rectangle, the dimensions of which are about the same as the interior of the superstructure A. This tunnel is also under ground, but it is located in a plane above the tunnels $b$ $b'$, the top level of the latter being the bottom level of this rectangular tunnel $b^2$. Obviously this underground passage $b^2$ connects with the cross-passage $b'$ on each side of the kiln, as seen in Fig. 4. There is also provided a central longitudinal passage or tunnel $b^3$, extending between the end sections of $b^2$ and opening into each. The upper level of the underground passages $b^2$ $b^3$ is still some distance below the surface of the ground, and in the latter, immediately below the superstructure, a shallow recess or chamber D is cut out, the dimensions of which are substantially the same as those of the regular kiln-flooring on which the brick or other articles to be burned are piled. In this shallow chamber cross-partitions $d$ $d^2$ are constructed, which are arranged with spaces between them a little less than the length of the flooring-brick. These partitions are preferably made of fire-brick. They are alternately closed and open at the ends—that is, the partitions $d$ extend from side to side of the kiln, while the alternates $d^2$ stop a little short thereof, so as to make passages around their ends, as seen in Fig. 5 of the drawings, so that there is thus provided a passage from each channel with a closed bottom at each end into the next channel with an opening in the bottom in this shallow chamber from one end of the kiln to the other. In the ground floor of this chamber there are also openings $d'$ cut through into the central passage $b^3$, these openings or apertures $d'$ being arranged in alternate spaces between the cross-partitions $d$, as seen in Fig. 5. The superstructure A is built above this underground structure. This upper portion is, in the main, of ordinary construction and requires but little description here. It is built with side walls $a$ and end walls $a'$ and the usual arched roof $a^2$. On the inside of the side walls there are false or fire walls A', standing a little distance from the inside of the said side walls, so as to leave a space between them, and as these false walls do not extend quite to the top of the kiln this space opens out into the interior of the kiln near the top thereof. Along the sides of the kiln the furnaces F are arranged in series, as usual, each one being provided with a flue $f$, opening into the space between the side walls and the false walls.

The regular flooring G of the kiln is laid upon the partitions $d$ $d^2$, thus forming the covering of the recess or chamber D. This flooring is, as usual, of fire-brick, and is composed of alternate layers of brick $g$, having grooves or recesses $g'$ in one side thereof and bricks $g^2$, which are entire. The layer of brick over the channels between the partitions, the flooring of which is entire—that is, in which there are no apertures $d'$ into the central tunnel below—is composed of the grooved brick $g$, while the said channels provided with these apertures $d'$ are covered by the entire brick $g^2$, as seen in Fig. 5. It will be seen then that in every alternate layer of this flooring there are apertures $g'$ communicating with channels in the space below, and by the construction and arrangement of the partitions, as already described, in this space below there is communication from the passages or channels into which these floor-openings lead around the ends of the partitions into the channels having openings $d'$ down into the central tunnel below. Doors $a^3$ are provided in the ends of the superstructure A, whereby admission is provided to the interior.

In order to provide for access to the underground passages or tunnels, a pit or manhole H is constructed at each end of the kiln just outside the end walls thereof. Under the arrangement shown in the drawings these pits are just in front of the doors $a^3$. These pits extend down to the bottom level of the upper tunnel or ground passage $b^2$ and open into the end divisions of the latter, as seen in Fig. 1. The manholes are protected by suitable covers or trap-doors $h$, and doors $h'$ control the opening at the bottom into the tunnel $b^2$. The manhole at the end of the kiln next to the smoke-stack is also connected at its bottom by a second manhole I with the lower tunnel or underground-passage $b$, the opening being made directly into the extension $c'$ of the latter, which leads to the stack, as seen in Fig. 1. This lower manhole is protected by a cover or trap-door $i$.

The bricks or other articles to be burned are laid upon the floor in a pile J in the interior of the kiln, as usual, and the operation is as follows: The hot air and gases resulting from the combustion in the furnaces are drawn thence through the flues $f$ into the wall-spaces at the sides of the kiln, up which they pass, and thence escape into the upper part of the kiln to the bricks piled within. The draft is thence downward through the apertures $g'$ in the flooring to the channels in the chamber D below and thence from the closed bottom channels around the open ends of the partitions, as seen in Fig. 5, to channels communicating with the central tunnel $b^3$, down through the openings in which the gases pass into said central tunnel, and thence in both directions out into the tunnel or passage $b^2$, as indicated by the arrows in Fig. 4, passing to the central side openings into the cross-tunnel $b'$, down which they are drawn, and thence out through the tunnel or flue $b$ to the stack, as indicated by arrows in Fig. 3. It will be noticed that the draft-apertures in the floor of the kiln are evenly distributed over the latter and that the arrangement of flues below is also evenly distributed, so that there will be a comparatively even draft throughout the kiln, which will result in comparatively uniform burning of the brick or other articles placed therein. This uniformity of operation is further secured by the arrangement of the underground tunnels $b^2$ $b^3$, from which it will be seen that the flue-openings into them are uniform in different parts of the kiln, so that the draft is substantially the same all along the floor of the latter, as indicated by arrows in Fig. 1, and the escape from the central flue $b^3$ into the outside flue $b^2$ is equally free at each end of the former, and hence the draft is the same on each side of the kiln till the final downward direction of the current midway of the length of the kiln and on each side thereof into the lower tunnels $b$ $b'$. In order to obtain sufficient draft for this operation, the stack should be somewhat higher than in ordinary kilns.

In Figs. 8 and 9 a modification is shown relating simply to the arrangement of the lowest underground flues or tunnels. In this construction the lower cross-tunnel $b'$ is provided the same as already described, and it communicates with the structure above in the same way; but instead of the single passage $b$ leading to the stack there are four tunnels or flue-passages K, commencing near the respective extremities of the tunnel $b'$ and extending outward thence toward the respective ends of the kiln. There are thus four flues leading from the central passage $b'$ toward the respective corners of the kiln, and at each of these corners there is erected a smoke-stack L, with which one of these flues K communicates.

In this modification a somewhat stronger draft may, perhaps, be obtained than in the construction first described. If desired, the stacks may be provided each with two flues $l$, as seen in Fig. 8, in which case each passage K is branching at the outer end, the two branches $k$ connecting, respectively, with the two flues of the stack, as seen in the same figure. In this construction, with the main flues provided underground and formed in the ground itself, it is evident that a clay soil is to be preferred, for when the kiln is built upon clay there will be no difficulty in cutting the tunnels therein for the flues, as herein described. In case, however, it is desired to build the kiln on ground of a different nature it may be accomplished by providing artificial roofing for the tunnels in the shape of firebrick or other suitable material. In the roof of the kiln there are openings $a^4$ for the purpose of ventilating and cooling off the interior, as may be desired. These openings may be provided with suitable dampers, by which they may be closed or opened, as occasion may require. The dimensions of the kiln and the several parts thereof herein described and shown will of course vary and are regulated according to the amount of work required of the kiln.

Having thus described my invention, what I claim as new, and desire to secure by Letters Patent, is—

1. The furnaces, in combination with flues to conduct the heated gases directly into the interior of the kiln, the kiln-floor freely perforated for the passage of gases down through the same, underground passages $b^2$ $b^3$ below the kiln-floor and connecting with the apertures therein, and the lower sub-flues $b$ $b'$, the former connecting with the stack and the latter with the sub-flues $b^2$ $b^3$, substantially as described.

2. In a brick-kiln in which the hot gases are delivered into the upper part of the interior of the kiln, the kiln-floor G, composed of perforated bricks $g$ and entire bricks $g^2$ in alternate rows, in combination with the shallow chamber D, divided by partitions $d$ $d^2$ with openings or passages at their alternate ends, and a sub flue or passage $b^3$, arranged below said chamber and provided with openings $d'$, connecting with alternate spaces in the partitioned chamber above and also connected suitably with the stack, whereby the draft is down, through the material piled in the kiln and the kiln-floor into the said sub-flue and through this to the stack, substantially as described.

3. In a brick-kiln, the underground flue-passage $b$, connecting with the stack, in combination with the cross-passage $b'$ on the same level, the upper sub flue or passage $b^2$, extending around the four sides of the kiln on a plane just above the passages $b$ $b'$ and connecting with the latter at two opposite sides, the central sub-flue $b^3$, running lengthwise of the kiln and connecting at each end with the flue $b^2$, and a perforated kiln-floor connected by suitable passages with said central flue $b^3$, substantially as described.

4. In a brick-kiln, the underground flue $b$, connected with the stack, in combination with the cross-flue $b'$, the rectangular flue $b^2$, central flue $b^3$, chamber D, provided with partitions $d$, the floor G, constructed of alternate rows of perforated and entire brick $g$ $g^2$, the false side walls A', whereby upward side flues are provided, and the furnaces F, provided with flues connecting directly with said side flues, the several parts constructed and connected for operation substantially as described.

STEPHEN J. PLANT.

Witnesses:
CARRIE FEIGEL,
A. M. BEST.